United States Patent [19]

Wilson

[11] 4,208,064
[45] Jun. 17, 1980

[54] HITCH CONSTRUCTION

[76] Inventor: George Wilson, 83 Cambria St., Stratford, Ontario, Canada, N5A 1G8

[21] Appl. No.: 925,948

[22] Filed: Jul. 19, 1978

[51] Int. Cl.² ............................................. B60D 1/14
[52] U.S. Cl. .................................................. 280/502
[58] Field of Search ............ 280/502; 24/68 CT, 69 T, 24/69 ST; 254/78

[56] References Cited
U.S. PATENT DOCUMENTS

| 3,547,470 | 12/1970 | Parkhurst | 280/502 |
| 4,027,894 | 6/1977 | Hawkins | 280/502 |

Primary Examiner—Joseph F. Peters, Jr.
Assistant Examiner—Donn McGiehan
Attorney, Agent, or Firm—Hirons, Rogers & Scott

[57] ABSTRACT

The invention provides a hitch intended especially as a bumper hitch for automobiles and employing a pair of adjustable-length chains to connect the hitch to the bumper. The two chains are connected to the arms of a centrally-pivoted, two-armed lever and the lever pivot is moved backwards by a cam to tighten them simultaneously, with the lever pivoting to take up inequalities. The cam pivots about the lever pivot and engages a reaction member to produce the tightening movement, the cam having a "dead" position on tightening so that it will not move voluntarily out of that position. The hitches can be used in pairs on a transverse trailer-ball carrying bar which extends through the hitch bodies and also constitutes the reaction member for each hitch cam. The hitches are retained on the bar and slide freely thereon until the cam is moved to the tightened position, when it also locks the respective hitch in transverse position on the bar by its reaction engagement with the bar. The hitch body also has lugs to receive an automobile towing A-frame.

21 Claims, 5 Drawing Figures

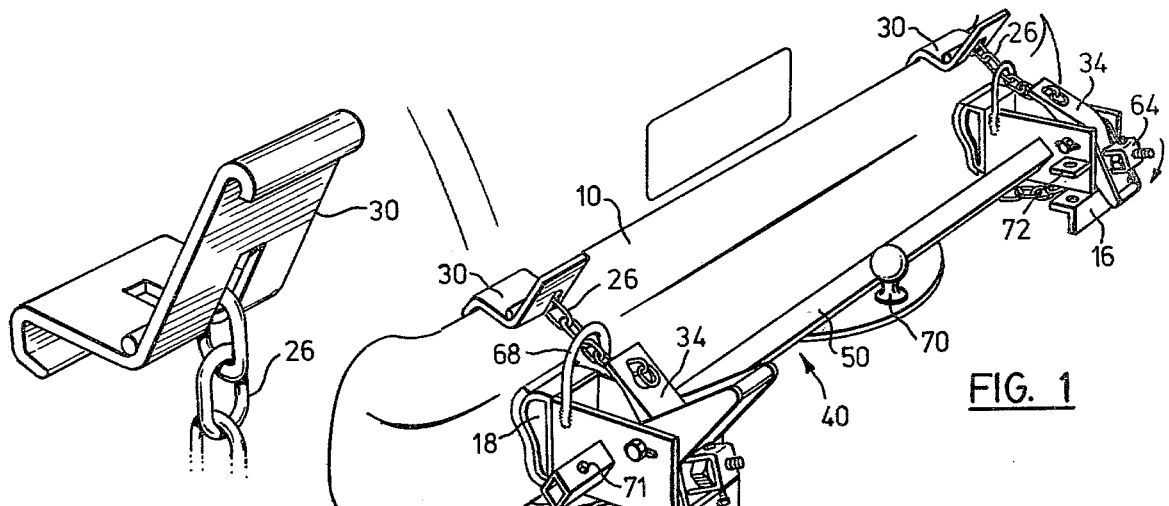
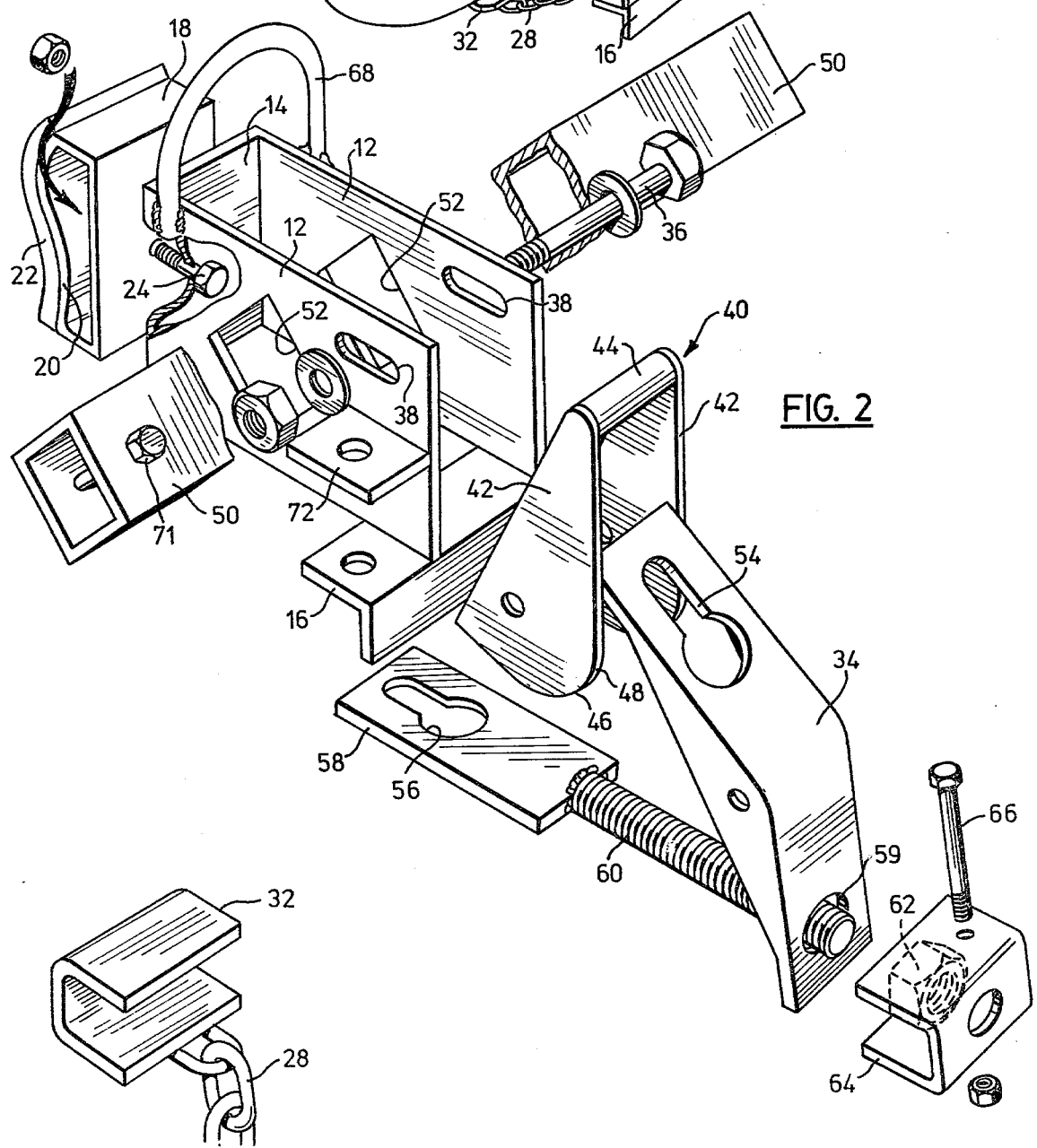

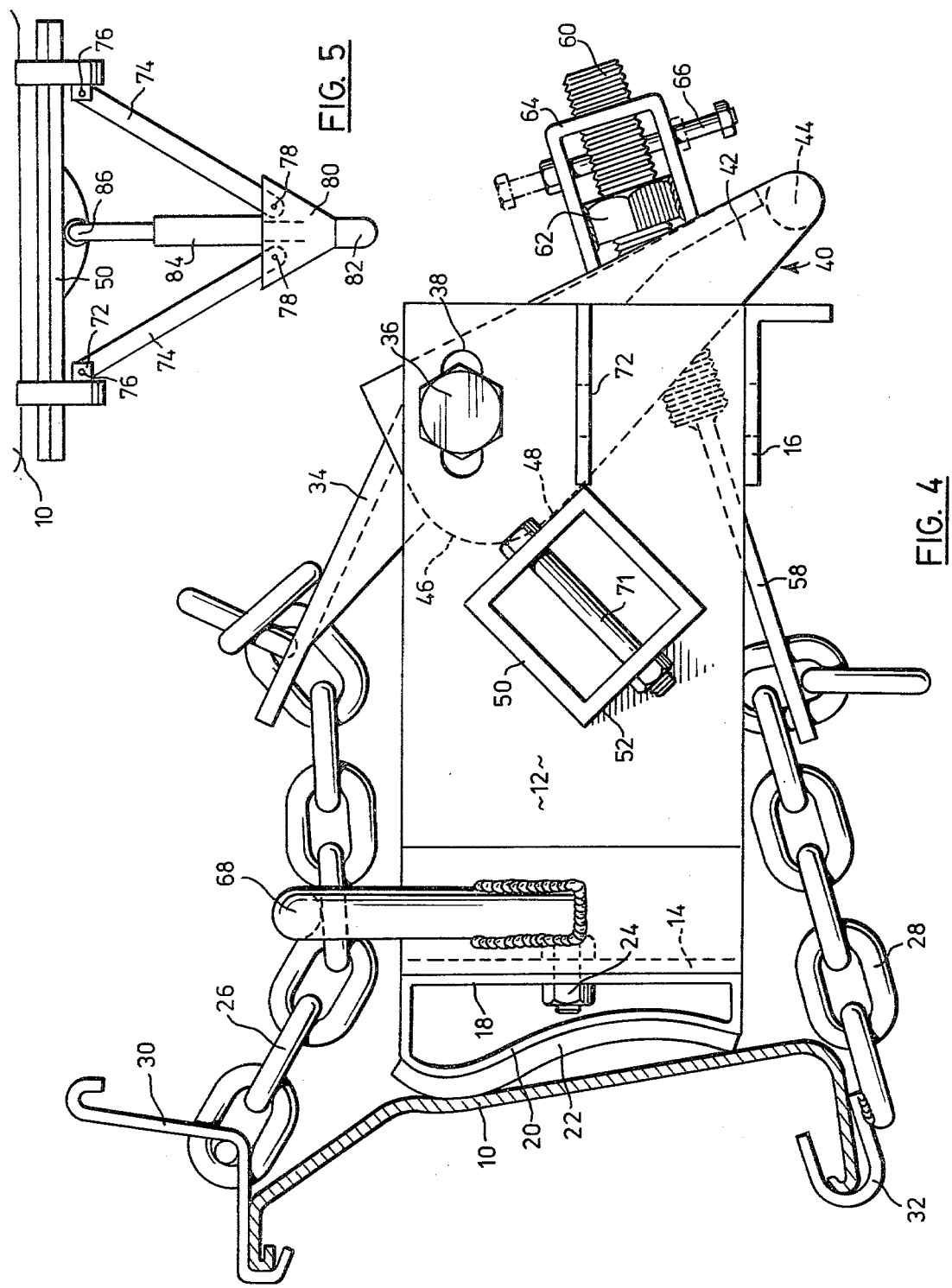

HITCH CONSTRUCTION

FIELD OF THE INVENTION

The present invention is concerned with improvements in or relating to hitches of the type that are adapted to be attached to vehicle bumpers and the like to permit, for example, the towing of another vehicle such as a trailer.

REVIEW OF THE PRIOR ART

A novelty search carried out among U.S. Pat. Specifications in class 280, subclass 502 (Coupling element requiring no modification of bumper) prior to the preparation and filing of the present application revealed as the most pertinent reference noted U.S. Pat. No. 4,027,894. This shows a coupling head for attachment to a bumper in which a coupling body is engaged with the lower edge of the bumper and tightens a chain which is connected at its upper end via a hook to the upper edge of the bumper. The lower end of the chain is connected via a link to a pivoted lever that is rotated downwardly to tighten the chain; one part of this lever is formed as a cam which holds a locking member at the upper end of a downwardly inclined slot. When the tightening lever has moved to a predetermined fully tightened position, as set by a nut on the link, this cam allows the locking member to descend under gravity in its slot and engage beneath the lever, preventing the lever from returning until the locking member is moved manually. The tightening action in this device is produced by movement of the link/lever connection about the fixed-position lever pivot. Provision is made to connect a tow bar to the device.

DEFINITION OF THE INVENTION

It is an object of the invention to provide a new bumper hitch construction that is versatile in its application and can be secured to a vehicle bumper, or equivalent structure, without the need of a tool such as a wrench.

In accordance with the present invention there is provided a hitch comprising:

a hitch body;

a two-armed lever pivotally mounted on the body by a pivot disposed between its two ends;

means mounting the said lever pivot for movement parallel to the pivot longitudinal axis;

two flexible connections each adapted for fastening engagement with a body to which the hitch is to be fastened thereby, and each connected to a respective one of the lever arms, and moving means mounted by the hitch body and connected to the lever pivot to move the lever pivot in opposite directions to respectively tighten and loosen the flexible connections.

Also in accordance with the invention there is provided a hitch comprising a hitch body; at least one flexible connection having one end adapted for fastening engagement with a body to which the hitch body is to be fastened thereby; cam means mounted by the hitch body for movement thereon and connected to the other end of the said flexible connection, the said cam means being pivotally mounted on the hitch body by a pivot member having an axis and movably mounted in spaced parallel slots in the hitch body, and having a cam face struck about the pivot axis of increasing radial distance from the pivot axis, the cam means being movable between two positions in one of which the connection means is tightened and in the other of which is it loosened; a reaction member mounted by the hitch body for transverse movement thereon and engaged by the cam face of the cam means as a reaction member to tighten the flexible connection, the cam face engaging the reaction member whereby rotation of the cam means about its pivot axis moves the pivot member in the said slots and thereby both tightens the flexible connection and also locks the reaction member against said transverse movement.

Further in accordance with the present invention there is provided a hitch comprising: a hitch body; two flexible connections, each having one end adapted for fastening engagement with a body to which the hitch body is to be fastened thereby; cam means mounted by the hitch body for movement thereon and connected to the other end of both of the said flexible connections, the cam means being movable between two positions in one of which the connection means are both tightened and in the other of which they are both loosened; a reaction member mounted by the hitch body for transverse movement thereon and engaged by the cam means as a reaction member to tighten the flexible connections, movement of the cam means to the connection tightening position also locking the reaction member against said transverse movement.

DESCRIPTION OF THE DRAWINGS

A hitch consisting of a bumper hitch for vehicles that is a particular preferred embodiment of the invention will now be described, by way of example, with reference to the accompanying diagrammatic drawings, wherein:

FIG. 1 is a general perspective view showing two hitches of the invention applied to a vehicle bumper and carrying a tow bar between them, the hitch to the right of the figure being tightened, while the hitch to the left of the figure is loosened;

FIG. 2 is an exploded view of the hitch to show the details of its construction;

FIG. 4 is a similar view to FIG. 3 showing the hitch in tightened position, and

FIG. 5 shows an A-frame towing structure employing two hitches of the invention.

DESCRIPTION OF THE PREFERRED EMBODIMENTS

Figure 3:
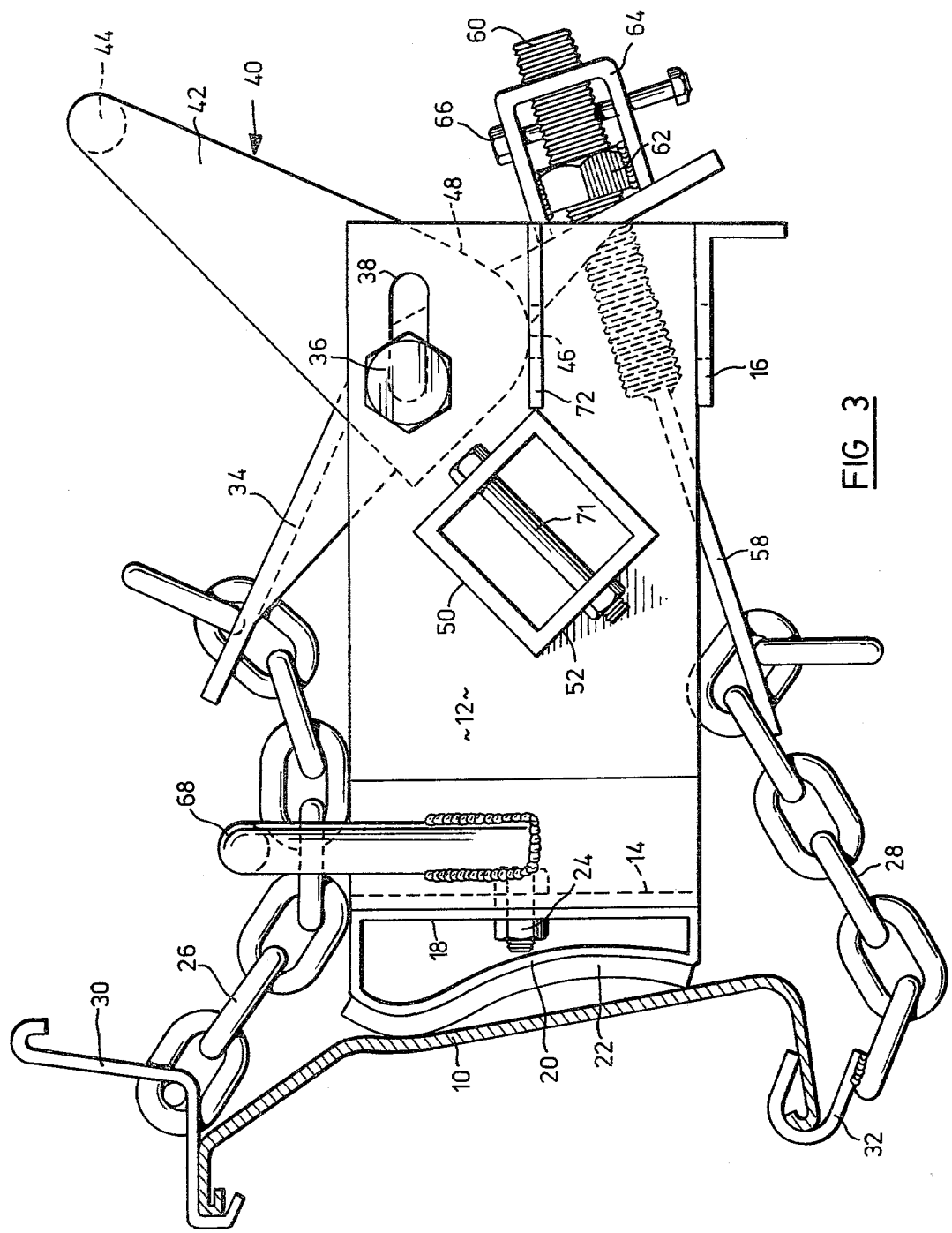
FIG. 3 is a side elevation showing the hitch in loosened position.

A hitch of the invention can be employed in applications other than attached to an automobile bumper 10, but that is its most usual employment and accordingly the embodiment illustrated is specifically suited to that purpose.

The hitch comprises a rectangular body or frame having two parallel side walls 12 joined by a transverse front end wall 14. The walls are also joined at their rear end by an angle-iron member 16, whose other functions will be described below. The front wall carries a cushioned compensating member 18 having a curved front face 20 to which is fixed a pad 22 of resilient material. The member 18 is attached to the wall 14 by a swivel pin 24, so that the pad can be rotated about an axis extending into the bumper into the most appropriate position to nestle as closely as possible against the bumper 10. The hitch is connected to the bumper by two flexible connections consisting of upper and lower chains 26 and 28, each connected at one end to a respective upper and lower hook 30 and 32, which is engaged over the respective bumper edge. The lower hook is permanently fastened to its chain end, while the hook 30 is double-ended and can be turned to present the most suitable of the two hooks to the bumper edge.

Each chain is connected adjacent its other end by an adjustable connection to a respective arm of a two-armed lever 34 pivoted to the frame by a pivot pin 36, the pin being engaged in registering elongated slots 38 in the side walls 12, so as to be movable toward and away from the bumper 10 parallel to its pivot axis. The pin 36 also serves as the pivot for a cam member 40 constituted by two spaced parallel side members 42 and a connecting cross bar handle 44. The edges 46 of the member 42 adjacent to the pin 36 are shaped to form parallel cam surfaces of progressively radial increasing distance from the pivot axis of the pin 36, these edges being adapted for camming engagement with a fixed part of the hitch frame, which provides a reaction member for the cam, this reaction member being constituted by a piece 50 of square-section tube mounted to slide freely along its longitudinal axis through correspondingly square-shaped apertures 52 in the side walls 12. The adjustable connection for the upper chain 26 and the respective arm of the lever 34 consists of a keyhole slot 54 in the lever arm, permitting the effective length of the chain to be altered by one or more link lengths. Coarse and fine adjustments are provided for the lower chain 28, the coarse adjustment consisting of a keyhole slot 56 in a plate 58, while the fine adjustment consists of a threaded rod 60 attached to the plate 58, the rod passing through an aperture 59 in the other lever arm and carrying a nut 62 that is embraced by a cover 64, the cover carrying an axially-movable cam-member retaining bolt 66.

In operation, to clamp the hitch to the bumper 10 the hook 30 is engaged with upper edges and the compensating pad 18 swivelled to the most suitable position. The upper chain is first adjusted in length and it will now be found that the hitch will sit against the bumper with the lever 34 in the extreme anti-clockwise position and the hitch frame sagging a little from the illustrated horizontal position. The upper chain passes through a rigid transverse loop member 68 preventing the hitch from shifting downwards, either at this time, or while in use. The effective length of the lower connection is now adjusted and the cam member 40 is then rotated from the unlocked position shown in FIG. 3 and the left hand part of FIG. 1, to the locked position shown in FIG. 4 and the right hand part of FIG. 1. It will be seen that the cam has thereby moved through its range of movement in which the curved cam edges 46 are in contact with one of the cooperating flat cam faces of the bar 50, to a position in which straight edge portions 48 are in contact with the bar cam face, so that the cam is effectively over its top dead centre, and the reaction force against the cam is not able to pivot it back to the unlocked position.

As the cam member 40 rotates about the pivot pin 36 the camming action against the bar reaction member moves the pin rearwards in the slots 38 parallel to its pivot axis, simultaneously tightening the chains 26 and 28. The lever 34 is able to pivot freely about the pin 36 so as to adjust automatically for the fact that the upper chain may otherwise be somewhat too long or too short, and permitting the hitch frame to be maintained in the desired level position. It will also be seen that the fine adjustment provided for the lower chain 28 is also effective with the upper chain 26. The pin 66 is arranged to be normally in the path of movement of the cam crossbar 44, and must be moved out of the path for the cam member to move to the fully locked position; it therefore serves as an additional safety retainer member preventing the cam member from moving to the unlocked position.

It will also be seen that in the loosened position illustrated by FIG. 3 the square section cross-tube 50 can slide freely transversely in the apertures 52. This tube in this embodiment constitutes a transverse tow bar, as illustrated by FIG. 1, carrying a tow ball 70 at its centre point, two of the hitches being mounted thereon at each end. When the cam member 40 is moved to the tightened position shown in FIG. 4 its engagement with the bar as a reaction member locks the bar against transverse movement as well as tightening the chains, so that the tow bar is rigidly fixed in position between the two hitches. The towing bar that is thus formed can therefore readily be adjusted to different bumper widths and types and rapidly attached and detached without the use of special tools. The hitches are retained permanently on the bar by end stops 71.

The angle iron 16 is positioned to protect the handle cross-bar 44 against accidental knocks, and to screen the threaded rod 60 against road dust and spashes. In addition it cooperates with another lug 72 above to serve as the anchor point for one arm 74 (FIG. 5) of an automobile tow bar A-frame, such as is used to tow a second automobile from the rear of a first automobile. The arms 74 are pivoted at one end to angle 16 and lug 72 by a bolt 76 and at the other end by bolt 78 to a plate 80 carrying a trailer tongue coupler 82. A central stabiliser bar 84 is fastened to the plate 80 and has a tongue coupler 86 that engages with the ball 70, the bar 84 preventing the A-frame from getting out of alignment and acting as a safety connection.

Although the invention has been described embodied in a automobile bumper hitch it is applicable to hitches intended for other purposes. Although the embodiment described employs chains as flexible connecting members the principles of the invention are also applicable to hitches employing for example cables for this purpose.

I claim:

1. A hitch comprising:
    a hitch body;
    a two-armed lever pivotally mounted on the hitch body by a pivot disposed between its two ends;
    means mounting the said lever pivot for movement parallel to the pivot longitudinal axis;
    two flexible connections each adapted for fastening engagement with a body to which the hitch is to be fastened thereby, and each connected to a respective one of the lever arms, and
    moving means mounted by the hitch body and connected to the lever pivot to move the lever pivot in opposite directions to respectively tighten and loosen the flexible connections.

2. A hitch as claimed in claim 1, wherein the said means for moving the lever pivot comprise cam means connected to the lever pivot and in cam engagement with a reaction member of the hitch body to tighten the flexible connections, movement of the cam means in said cam engagement moving the lever pivot for the said tightening and loosening of the flexible connections.

3. A hitch as claimed in claim 2, wherein the said cam means comprise a cam member pivotally mounted on the lever pivot for pivoting movement thereof in cam engagement with the reaction member.

4. A hitch as claimed in claim 2, wherein the said lever pivot is movably mounted in spaced parallel elongated slots, said cam means is pivotally mounted on the lever pivot and has a cam face struck about the lever pivot axis of increasing radial distance from the pivot axis, the cam face engaging the reaction member whereby rotation of the cam means about the axis moves the lever pivot in the said slots and thereby tightens the flexible connections.

5. A hitch as claimed in claim 2, wherein the said reaction member is mounted by the hitch body for transverse movement therein, and wherein movement of said cam means into cam engagement with the stationary member to tighten the flexible connections locks the stationary member against such transverse movement in the hitch body.

6. A hitch as claimed in claim 2, wherein the said cam means comprises a cam member pivotally mounted on the hitch body and having a cam face struck about the member pivot axis of increasing radial distance from the pivot axis, the cam member cam face engaging a cam face of the reaction member, whereby rotation of the cam means about the axis moves the member pivot and thereby tightens the flexible connections, the cam face having a portion that in a connection tightened position lies parallel to the engaged cam face of the reaction member, so that the reaction between the cam member and the reaction member cannot move the cam member out of the said position.

7. A hitch as claimed in claim 6, and including a retainer member engaging the cam member in the said tightened position to retain it against movement out of that position.

8. A hitch as claimed in claim 1, wherein the lever is provided at each end with means for adjusting the length of the flexible connections.

9. A hitch as claimed in claim 8, wherein the flexible connections are chains, the means for adjusting the length of one chain comprises a key-hole shaped slot in the respective lever arm and through which the chain passes, and the means for adjusting the length of the other chain comprises a member having therein a key-hole shaped slot through which the chain passes, the member being connected to the other lever arm by an adjustable length screw-threaded connection.

10. A hitch as claimed in claim 1, and for use as an automobile bumper hitch, wherein the flexible connections are chains, and the chain that is to be the uppermost chain when the hitch is mounted on the bumper passes through a rigid transverse loop member on the hitch body to hold the body against the chain and oppose downward slipping of the body against the bumper.

11. A hitch as claimed in claim 1, and for use as an automobile bumper hitch, wherein the hitch body is provided with at least one transversely extending lug for attachment thereto of an automobile towing A-frame.

12. A hitch as claimed in claim 5, and for use as an automobile bumper hitch, wherein the said reaction member comprises a transverse bar carrying a tow hitch ball, on which bar the hitch is mounted so that it is connected to the automobile bumper by the hitch.

13. A hitch comprising:
a hitch body;
at least one flexible connection having one end adapted for fastening engagement with a body to which the hitch body is to be fastened thereby;
cam means mounted by the hitch body for movement thereon and connected to the other end of the said flexible connection, the said cam means being pivotally mounted on the hitch body by a pivot member having an axis and movably mounted in spaced parallel slots in the hitch body, and having a cam face struck about the pivot axis of increasing radial distance from the pivot axis, the cam means being movable between two positions in one of which the connection means is tightened and in the other of which it is loosened;
a reaction member mounted by the hitch body for transverse movement thereon and engaged by the cam face of the cam means as a reaction member to tighten the flexible connection, the cam face engaging the reaction member whereby rotation of the cam means about its pivot axis moves the pivot member in the said slots and thereby both tightens the flexible connection and also locks the reaction member against said transverse movement.

14. A hitch as claimed in claim 13, and including two of said flexible connections, wherein the cam means is connected to the other ends of both of the flexible connections and movement of the cam means to the connection tightening position simultaneously tightens both of the flexible connections.

15. A hitch as claimed in claim 13, and for use as an automobile bumper hitch, wherein the said reaction member comprises a transverse bar carrying a tow hitch ball, on which bar the hitch is mounted so that it is connected to the automobile bumper by the hitch.

16. A hitch as claimed in claim 13, wherein the cam member cam face has a portion that in a connection tightened position lies parallel to the engaged cam face of the reaction member, so that the reaction between the cam member and the reaction member cannot move the cam member out of the said position.

17. A hitch as claimed in claim 16, and including a retainer member engaging the cam member in the said tightened position to retain it against movement out of that position.

18. A hitch as claimed in claim 13, and for use as an automobile bumper hitch, wherein the hitch body is provided with at least one transversely extending lug for attachment thereto of an automobile towing A-frame.

19. A hitch comprising:
a hitch body;
two flexible connections, each having one end adapted for fastening engagement with a body to which the hitch body is to be fastened thereby;
cam means mounted by the hitch body for movement thereon and connected to the other end of both of the said flexible connections, the cam means being movable between two positions in one of which the connection means are both tightened and in the other of which they are loosened;
a reaction member mounted by the hitch body for transverse movement thereon and engaged by the cam means as a reaction member to tighten the flexible connections, movement of the cam means to the connection tightening position also locking the reaction member against said transverse movement.

20. A hitch as claimed in claim 19, and for use as an automobile bumper hitch, wherein the said reaction member comprises a transverse bar carrying a tow hitch ball, on which bar the hitch is mounted so that it is connected to the automobile bumper by the hitch.

21. A hitch as claimed in claim 19, and for use as an automobile bumper hitch, wherein the hitch body is provided with at least one transversely extending lug for attachment thereto of an automobile towing A-frame.

* * * * *